United States Patent Office 3,365,480
Patented Jan. 23, 1968

3,365,480
NITROGEN-CONTAINING THIOLSULFONATES
Raymond L. Cobb and Clarence R. Bresson, Bartlesville, Okla., assignors to Phillips Petroleum Company, a corporation of Delaware
No Drawing. Filed June 18, 1964, Ser. No. 376,233
4 Claims. (Cl. 260—453)

The invention herein described was made in the course of or under a contract or subcontract thereunder, with the Department of the Army.

This invention relates to novel nitrogen-containing thiosulfonates. In another aspect, it relates to a process for preparing such novel nitrogen-containing thiosulfonates.

We have discovered that novel and useful nitrogen-containing thiosulfonates of the general formula:

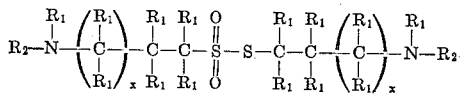

I can be prepared by the peroxide oxidation of nitrogen-containing disulfides of the general formula:

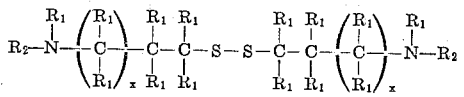

II which in turn can be prepared by oxidation of thiol precursors of the general formula:

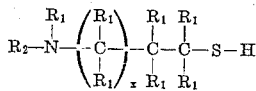

III where, in said general formulas, $R_1$ is selected from the group consisting of a hydrogen atom and methyl and ethyl radicals, $R_2$ is selected from the group consisting of a hydrogen atom, methyl and ethyl radicals, and the radicals (a) and (b)

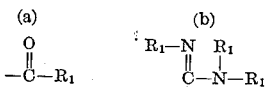

and x is an integer of 0 or 1.

Representative novel nitrogen-containing thiosulfonates of this invention, coming within the scope of general Formula 1, include:

2-aminoethyl 2-aminoethanethiolsulfonate,
3-aminopropyl 3-aminopropanethiolsulfonate,
2-methylaminoethyl 2-methylaminoethanethiolsulfonate,
2-ethylaminoethyl 2-cetylaminoethanethiolsulfonate,
2-formamidoethyl 2-formamidoethanethiolsulfonate,
2-acetamidoethyl 2-formamidoethanethiolsulfonate,
2-propionamidoethyl 2-formamidoethanethiolsulfonate,
2-guanidoethyl 2-formamidoethanethiolsulfonate,
2-methylguanidoethyl 2-formamidoethanethiolsulfonate,
2-(2,3-dimethylguanido)ethyl 2-formamidoethanethiolsulfonate,
2-(2,3-diethyl-3-methylguanido)-ethyl 2-formamidoethanethiolsulfonate,
2-(2-ethylbutyramido)ethyl 2-formamidoethanethiolsulfonate,
2-dimethylamino-1,1,2,2-tetramethylethyl 2-dimethylamino-1,1,2,2-tetramethylethanethiolsulfonate,
3-diethylamino-2-ethylpentyl 3-diethylamino-2-ethylpentanethiolsulfonate,
3-methylamino-3-methylpentyl 3-methylamino-3-methylpentanethiolsulfonate,
N-ethyl-3-formamidopropyl N-ethyl-3-formamidopropanethiolsulfonate,
3-acetamidobutyl 3-acetamidobutanethiolsulfonate,
3-propionamidopentyl 3-propionamidopentanethiolsulfonate,
2-ethyl-3-(1-methyl-1-guanido)propyl 2-ethyl-3-(1-methyl-1-guanido)propanethiolsulfonate,
2-ethyl-3-(2,3-dimethylguanido)propyl 2-ethyl-3-(2,3-dimethylguanido)propanethiolsulfonate,
3-ethyl-3(3,3-dimethyl-2-ethylguanido)pentyl 3-ethyl(3,3-dimethyl-2-ethylguanido)-pentanethiolsulfonate,
2,3-dimethyl-3-(3-ethyl-3-methylguanido)butyl 2,3-dimethyl-3-(3-ethyl-3-methylguanido)butanethiolsulfonate,
1,1,2,2,3-pentaethyl-3(1,2,3,3-tetraethylguanido)pentyl 1,1,2,2,3-pentaethyl-3(1,2,3,3-tetraethylguanido)pentanethiolsulfonate, and the like.

Where $R_2$ in the disulfide of general Formula II is $R_1$ or said radical (b), such disulfide is preferably used in the form of its acid salt, and the corresponding thiolsulfonate formed therefrom by the peroxide oxidation of this invention will also be such an acid salt and can be recovered as such or can by neutralization be recovered in its free base form. Such salts can be those of the organic and inorganic acids, including the hydrochlorides, sulfates, phosphates, acetates, benzoates, picrates, salicylates, p-toluene sulfonates, and the like.

Representative disulfide reactants, coming within the scope of general Formula II, include:

bis-(2-aminoethyl)disulfide,
bis(3-aminopropyl)disulfide,
bis(2-methylaminoethyl)disulfide,
bis(2-ethylaminoethyl)disulfide,
bis(2-formamidoethyl)disulfide,
bis(2-acetamidoethyl)disulfide,
bis(2-propionamidoethyl)disulfide,
bis(2-guanidoethyl)disulfide,
bis(2-methylguanidoethyl)disulfide,
bis[2-(2,3-dimethylguanido)ethyl]disulfide,
bis[2-(2,3-diethyl-3-methylguanido)-ethyl]disulfide,
bis[2-(2-ethylbutyramido)ethyl]disulfide,
bis(2-dimethylamino-1,1,2,2-tetramethylethyl) disulfide,
bis(3-diethylamino-2-ethylpentyl)disulfide,
bis(3-methylamino-3-methylpentyl)disulfide,
bis(3-amino-2-ethyl-2-methylbutyl)-disulfide,
bis(N-ethyl-3-formamidopropyl)disulfide,
bis(3-acetamidobutyl)disulfide,
bis(3-propionamidopentyl)disulfide,
bis[2-ethyl-3-(1-methyl-1-guanido)propyl]-disulfide,
bis[2-ethyl-3-(2,3-dimethylguanido)propyl]disulfide,
bis[3-ethyl-3(3,3-dimethyl-2-ethylguanido)pentyl]disulfide,
bis[2,3-dimethyl-3-(3-ethyl-3-methylguanido)butyl]disulfide,
bis[1,1,2,2,3-pentaethyl-3(1,2,3,3-tetraethylguanido)-pentyl]disulfide, and the like.

The disulfide precursors of the novel nitrogen-containing thiolsulfonates of this invention can be prepared, in another aspect of this invention, by oxidation with air or a peroxide of amino- or amido-substituted alkane thiols of Formula III.

The peroxide oxidation of the disulfides of general Formula II, according to this invention, can be carried out at 20 to 150° C., employing a peroxide in an amount sufficient to provide about two atoms of nascent oxygen per mole of the disulfide. An excess of the peroxide is preferably avoided because such an excess may result in cleaving the disulfide and forming two moles of a sulfonic acid. Representative peroxide oxidizing agents which can be employed to oxidize the disulfides include hydrogen peroxide and relatively low molecular weight organic peracids such as performic acid, peracetic acid, perbenzoic acids, and the like. The pressure employed in the oxidation reaction can be autogenous pressure developed by the reaction at the chosen reaction temperature, and such pressures can be as high as 1,000 to 1,500 p.s.i.g. and even 2,500 p.s.i.g. and higher. The reaction times will vary considerably, depending upon the reaction temperature and other reaction variables, but generally will be in the range of 0.5 to 50 hours and usually less than 10 hours. The reaction can be carried out in reaction diluents such as methanol, ethanol, acetic acid, and the like, and where such diluents are polar compounds it is preferred that the disulfide reactants be used in the form of their acid salts because of their better solubility therein than that of the free base. Where an acid is employed as a reaction diluent, the addition of hydrogen peroxide thereto will form the corresponding peracid. Such an acid medium will also result in the formation of the acid salt of the thiolsulfonate product.

After completion of the oxidation reaction, the thiolsulfonate product can be recovered by any suitable well-known means. For example, gases or vapors can be vented, recovered, and recycled, if desired, and the thiolsulfonate products separated by solvent extraction, fractional distillation, crystallization, and various other separation and recovery procedures.

The novel nitrogen-containing thiolsulfonates of this invention are useful for a number of purposes, such as bactericides and fungicides.

The following examples serve to illustrate the objects and advantages of this invention, but the various reactants, conditions, and other details recited in these examples should not be construed so as to unduly limit this invention.

EXAMPLE I 1-amino-2-propyl 1-amino-2-propanethiolsulfonate sulfate was prepared as follows:

A solution of 74 g. of 1-amino-2-propanethiol in 200 ml. of methanol was oxidized by bubbling a stream of air through the solution at about 25° C. for 24 hr. The solution was then evaporated and the resulting oily residue was then stripped under aspirator pressure at 95–100° C. to remove the free, unreacted aminothiol. From this stripping procedure, 54 g. of crude bis(1-amino-2-propyl)-disulfide was obtained. This disulfide was dissolved in isopropyl alcohol and mixed with 30 g. of 98% sulfuric acid to convert the disulfide to the corresponding sulfate salt. After cooling, the insoluble sulfate salt of the disulfide was filtered, washed with ether and dried. Sixty-five g. of the dried sulfate salt was dissolved in 300 ml. of glacial acetic acid and mixed with 55 g. of 30% aqueous hydrogen peroxide, the resulting solution was heated on a steam bath while stirring, and the resulting exothermic heat of reaction was sufficient to cause reflux of the acetic acid. The solution discolored and very quickly began to cool. A peroxide test with lead sulfide paper almost immediately became negative, indicating that all of the peroxide was used up. The solution was then cooled and poured into 500 ml. of ether. This mixture was allowed to settle and the supernatant solution (ether and acetic acid) was removed. The resulting residual oil was treated with hot methanol, causing it to solidify. The resulting solid was filtered and recrystallized from dilute methanol to yield about 10 g. of a solid melting at about 200° C. This solid was recrystallized three times from dilute methanol to produce material which had a melting point of about 225° C. (with decomposition) and which was established by elemental analysis and infrared spectra as 1-amino-2-propyl 1-amino-2-propanethiolsulfonate sulfate.

EXAMPLE II 3-formamidopropyl 3-formamidopropanethiolsulfonate was prepared as follows:

A solution of 83.5 g. of 3-mercaptopropylformamide in 200 ml. of methanol was heated to reflux temperature and treated with 35 ml. of 30% aqueous hydrogen peroxide at a rate sufficient to maintain reflux. The solution was heated for an additional 15 min., after which the methanol and water were removed by evaporation under reduced pressure. The water-white product obtained was crystalline at low temperature, but liquid at room temperature, and had a refractive index $n_D^{20}$ of 1.5587 and confirmed by elemental analysis as 3,3′-dithiobispropylformamide. A solution of 69.1 g. of this product was oxidized in 100 ml. of methanol by the drop-wise addition of 60 ml. of 30% aqueous hydrogen peroxide over a period of 30 min. After the resulting exothermic reaction had subsided, the reaction solution was heated to 70–75° C. for 2-hr. The methanol and water then removed by stripping under vacuum, and the product was dried under high vacuum to yield a material having a refractive index $n_D^{20}$ of 1.5582 and was established by elemental analysis and infrared spectra as 3 - formamidopropyl 3 - formamidopropanethiolsulfonate.

EXAMPLE III 1-guanido-2-propyl 1-guanido-2-propanethiolsulfonate di-p-toluenesulfonate was prepared as follows:

A solution of 60.8 g. of 2,2′-dithiobispropylguanidine di-p-toluenesulfonate in 250 ml. of acetic acid was heated to 92° C. To this was added slowly 24 g. of 30% hydrogen peroxide. For the first part of the addition, the temperature decreased to about 90° C., but then an exothermic reaction occurred and the temperature rose to 104° C. It was held at this point by cooling in a water bath as needed. Addition required about 10 min., and the exothermic reaction continued for another 10 min. The peroxide test (lead sulfide paper) was negative at this time, but heating was continued on a steam bath for another 30 min. After cooling, the solution was poured into 800 ml. of ether. After allowing the resulting oil to settle, the solvents were decanted and discarded. The oil was washed twice by decantation with acetone. The residue was dissolved in a mixture of acetonitrile and methanol and the solution was cooled to −10° C. A small amount of a white solid, M.P. 335° C. dec., was collected; it was discarded after it was found to contain no nitrogen. The filtrate was evaporated to dyness under aspirator pressure and the residue was taken up in hot 1-butanol. Chilling in Dry Ice-acetone gave an insoluble resinous solid from which the butanol was decanted. This dissolving-chilling-decantation treatment of the insoluble oil was repeated using isopropyl alcohol and absolute ethanol. The alcohol solutions were combined and allowed to stand, giving a white solid, M.P. 175–177° C. More of this material was extracted from the resinous oil by exhaustive treatment in a small crystallizing apparatus which could be cooled to −70° C. with absolute methanol, ethanol, and isopropyl alcohol. Combining the alcohol solutions and allowing to stand gave additional white solid. A total of 4.5 g. was collected. This was dissolved in about 15 ml. of 95% ethanol and filtered. The filtrate was mixed with 100 ml. of acetone; cooling to −70° C. gave no solid. An equal volume of ether was added and cooling gave the desired 1-guanido-2-propyl 1-guanido-2-propanethiolsulfonate di-p-toluenesulfonate, M.P. 174–175° C.

Various modifications and alterations of this invention will become apparent to those skilled in the art from the foregoing description and examples without departing from the scope and spirit of this invention, and it should be understood that this invention is not to be limited unduly to the illustrative embodiments of this invention set forth hereinbefore.

We claim:
1. Thiolsulfonate compounds of the general formula

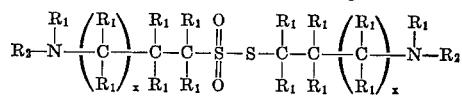

where $R_1$ is a hydrogen atom, a methyl or ethyl radical, $R_2$ is a hydrogen atom, a methyl, ethyl or —C(O)$R_1$ or —C(N$R_1$)—N($R_1$)$_2$, and $x$ is an integer of 0 or 1, and the corresponding acid salts of such compounds.

2. 1-amino-2-propyl 1-amino-2-propanethiolsulfonate sulfate.

3. 3-formamidopropyl 3-formamidopropanethiolsulfonate.

4. 1-guanido-2-propyl 1-guanido-2-propanethiolsulfonate di-p-toluene sulfonate.

References Cited

UNITED STATES PATENTS 2,664,385 12/1953 Wolff et al. _____ 260—453 X
3,153,078 10/1964 Fierce et al. _____ 260—453

OTHER REFERENCES

Kice et al.: J.A.C.S., 1960, vol. 82, p. 840.
Reid: "Organic Chemistry of Bivalent Sulfur," vol. 1, p. 330, 1958.
Kharasch: "Organic Sulfur Compounds," vol. 1, p. 97, 1961.

JOSEPH P. BRUST, *Primary Examiner.*